United States Patent [19]
Senn et al.

[11] 3,743,346
[45] July 3, 1973

[54] FOLDING CAMPER EXTENSION

[76] Inventors: Thomas A. Senn, 723 California Boulevard, Ridgecrest; Gerald J. Senn, 408A Thompson, China Lake, both of Calif. 93555

[22] Filed: Mar. 8, 1972

[21] Appl. No.: 232,678

[52] U.S. Cl............................ 296/23 MC, 296/26
[51] Int. Cl............................................. B60p 3/32
[58] Field of Search................... 296/23 MC, 23 R, 296/26, 27, 23 H; 52/66, 67, 68

[56] References Cited
UNITED STATES PATENTS

| | | | |
|---|---|---|---|
| 3,508,781 | 4/1970 | Anderson | 296/23 MC |
| 3,360,891 | 1/1968 | Gardner | 296/26 |
| 3,399,922 | 9/1968 | Burton | 296/23 R |
| 3,514,147 | 5/1970 | Forsyth et al. | 296/23 R |

*Primary Examiner*—Richard J. Johnson
*Assistant Examiner*—John A. Carroll
*Attorney*—Richard D. Seibel et al.

[57] ABSTRACT

A folding extension having all rigid walls for a camper or the like is provided in practice of this invention. A folding extension may be built onto each side of a camper body at the time it is built, or it may be provided as a kit to be added to the side of an existing camper for providing a supplemental berth. A floor section and a roof section are pivotally attached to the side wall of a camper to pivot down and up therefrom, respectively. The roof section folds down over the floor section when stowed to provide weather protection. Upon unfolding, a side wall and a pair of end walls slide outwardly from beneath the floor section and then pivot upwardly to form the walls of the extension. The roof section pivots back down over the side and end walls to hold them in place and close the assembly.

12 Claims, 6 Drawing Figures

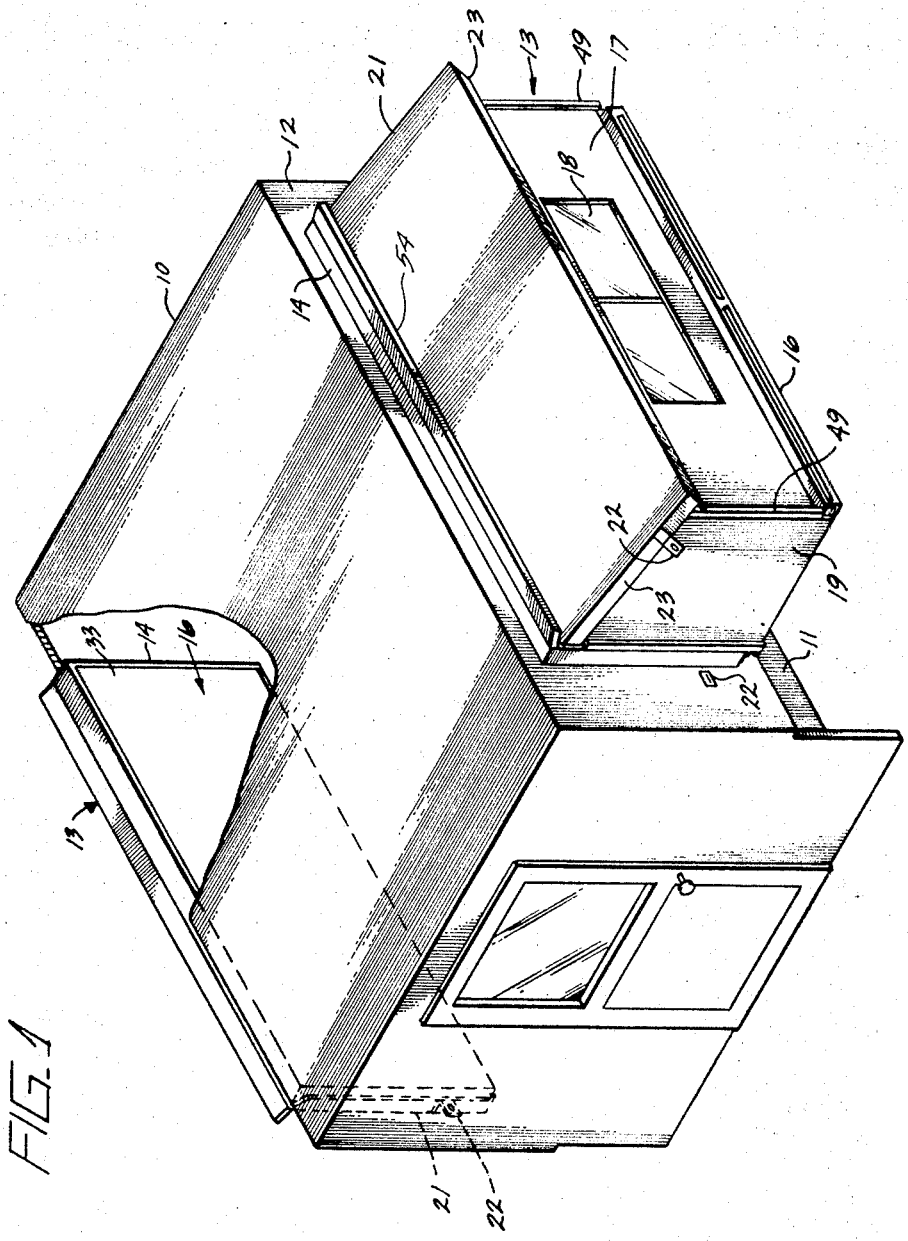

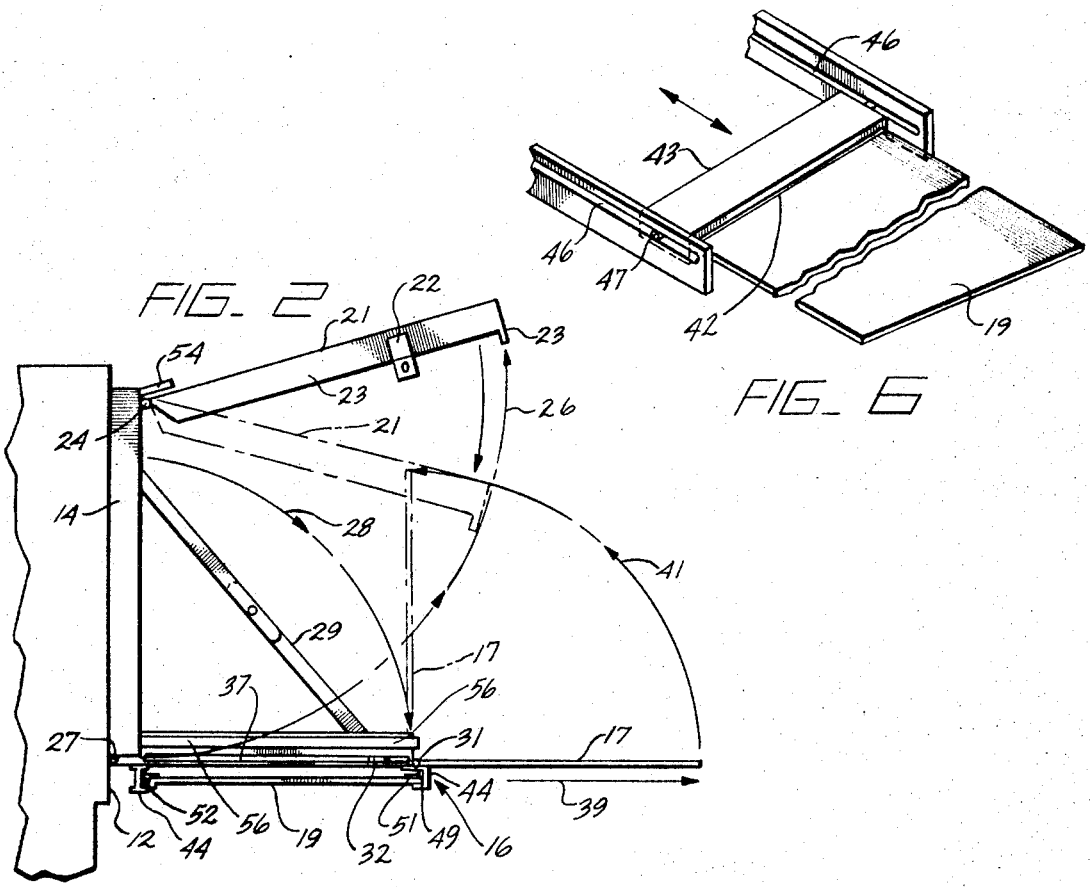
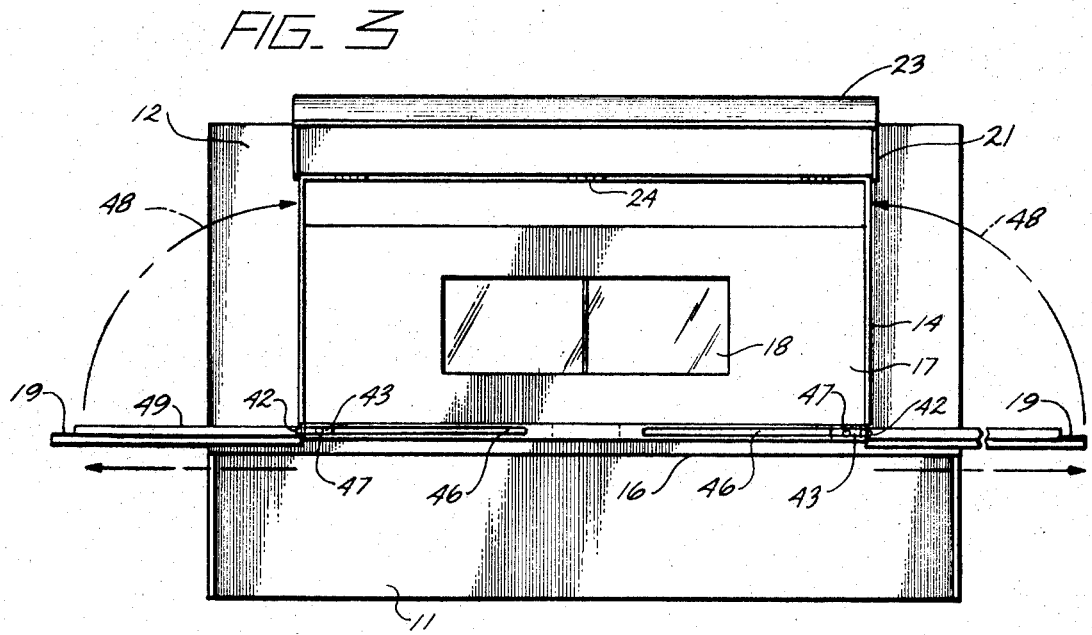

FOLDING CAMPER EXTENSION

BACKGROUND OF THE INVENTION

The use of campers set into the bed of pickup trucks has proliferated in recent years, and such units are extremely popular. A large variety of such units are available, ranging from relatively simple "boxes" set over the bed of a truck to provide a shelter, to large units set into the bed, and with an extension extending over the cab for additional sleeping space. Such large units are not only expensive, they are cumbersome on the road, and their height can limit some of the places they may wish to go.

Since the beds of pickup trucks are relatively narrow, there is little ability to provide increased width of a camper body. It also occurs that a family having a camper discovers that it would like to have a more commodious one without taking the loss of trading one in and buying a new one. For these reasons, it is desirable to provide side extensions that may fit onto the camper, either to provide additional sleeping space without increasing the height of the camper, or to provide additional sleeping space in an existing camper. Such extensions are, of course, not solely useful in camper bodies, but may also be advantageously used in trailers or the like as well.

It has been suggested in the past to provide side extensions on a camper; however, many of these have been at least partly formed of canvas, such as those illustrated in U.S. Pat. Nos. 3,399,922 and 3,514,147. The limitations of such a structure are apparent and well known.

Some collapsible, all-rigid extensions have been suggested, such as, for example, in U.S. Pat. No. 3,508,781. Typically, such extensions have been proposed as integral portions of the camper structure and have not afforded an opportunity to add an extension to an existing camper. Special means have also been required to provide sealing at the hinge lines and at the intersections of the walls to prevent cold air or rain from entering the extension. Some of the all-rigid units have folded the side walls directly against the floor of the extension when it is stowed. When this is done, the mattress or pad and the bedding used within the extension must be stored somewhere else within the camper. There is also difficulty in obtaining sufficient strength and stiffness in an extension to prevent deformations that would open up weather seals, particularly when a person has his weight resting on the floor of the extension.

It is, therefore, highly desirable to have an extension for a camper body that can be originally built into the body or provided as a kit for addition at a later time. Such an extension should be quite easily handled by a person for erecting or stowing, and it should provide good weather sealing and high structural rigidity.

BRIEF SUMMARY OF THE INVENTION

Therefore, in practice of this invention according to a presently preferred embodiment, there is provided a foldable extension for a camper body or the like having a floor section pivotally mountable on the camper wall for pivoting from a vertical stowed position to a horizontal use position extending outwardly from the camper wall. A side wall and a pair of end walls are each mounted for slidable movement between a semi-stowed position beneath the floor section and an intermediate position extending horizontally outwardly from the floor section. These walls are also pivotally movable between the intermediate position and a vertical use position extending upwardly from the edges of the floor section. A roof section when stowed covers the stowed floor section, and is pivotally movable to an elevated intermediate position extending outwardly from the camper wall, and a lower use position in engagement with the side and end walls of the extension.

DRAWINGS

These and other features and advantages of the invention will be appreciated as the same becomes better understood by reference to the following detailed description of a presently preferred embodiment when considered in connection with the accompanying drawings wherein:

FIG. 1 illustrates in perspective a camper body including a pair of extensions constructed according to principles of this invention;

FIG. 2 is an end view of one extension in an intermediate stage between stowed and use positions;

FIG. 3 is a side view of one extension in an intermediate stage between stowed and use positions;

FIG. 6 illustrates schematically a typical means for erecting a wall of the extension.

Throughout the drawings like reference numerals refer to like parts.

DESCRIPTION OF THE INVENTION

Figure 4:
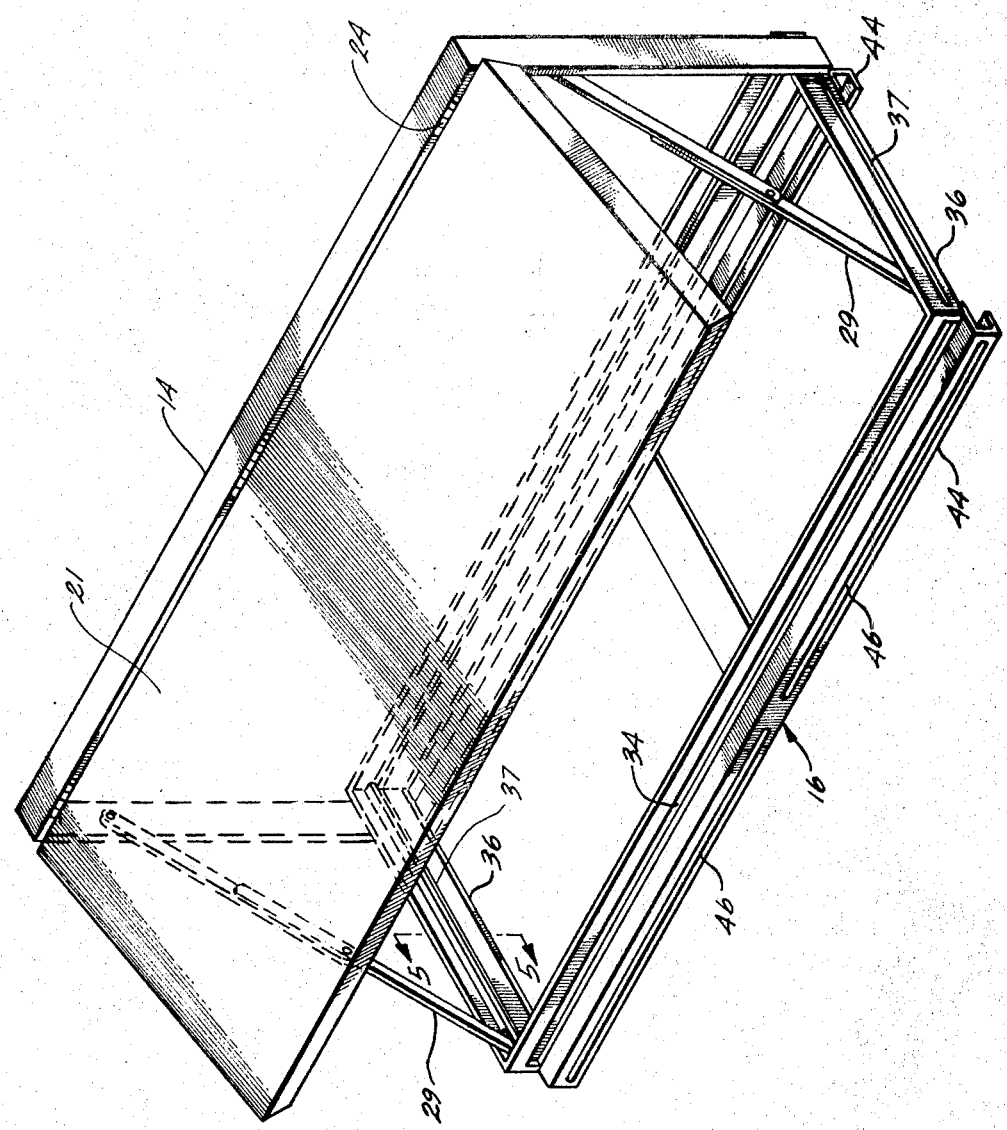
FIG. 4 is a skeleton view in perspective of an extension kit with the floor deleted and the end and side walls removed for clarity.

FIG. 1 illustrates in perspective a camper body having extensions constructed according to principles of this invention on either side thereof. Such a camper body is a conventional item and is indicated substantially semi-schematically herein since its details are of no great concern in practice of this invention. Such a camper body 10 typically has recessed portions 11 that fit between the walls of the bed of a pickup truck. Above these recessed portions, side walls 12 extend upwardly approximately in line with the sides of the truck or not greatly therebeyond. It is on such side walls 12 that an extension as provided in practice of this invention may be fitted.

In the embodiment illustrated in FIG. 1, an extension 13 is provided along each side of the camper on the side walls 12. The nearer extension 13 in FIG. 1 is shown in an erected or use position as it would be used while the camper is parked. The further extension is shown in a folded or stowed position that does not extend a substantial distance beyond the side of the camper, such as is used while the camper is traveling.

Each of the extensions is on a frame 14 secured to and through the wall 12 of the camper. The frame may be built into the camper wall 12 when the camper is initially constructed, or the frame may be added to an existing camper into the side of which a suitable hole has been cut. The extension has a floor section 16 at the bottom. A side wall 17 extends upwardly from the floor 16 and substantially parallel to the camper wall 12. Preferably, a window 18 is provided in the side wall of the extension. When provided in kit form, the side wall 17 typically does not have a window originally installed, and when the opening is cut in the camper side 12 to fit the frame 14, the window that is conventionally provided in the side of the camper is removed and installed in the side wall 17 of the extension. The extension also has a pair of end walls 19 and a roof 21 that complete the enclosure of the extension.

When the camper is folded or stowed for traveling, the upper surface 33 of the floor 16 faces the interior of the camper, as seen in the cutaway portion of FIG. 1. The roof 21 includes a conventional latch 22 at each end so that when the extension is folded down, as in the far side of FIG. 1, the roof is latched to the side of the camper. The latch 22 is preferably arranged so that when the extension is in its use position, as seen in the near side of FIG. 1, the same latch connects to the end wall 19 to secure the roof down. The roof section 21 also has eaves 23 around its three edges for sheltering the interface between the walls and roof. When the roof is folded down for traveling, the eaves fit around the frame 14 for sheltering the structure.

After the camper is parked, the extension is unfolded by first pivoting the roof 21 outwardly and upwardly on conventional latching hinges 24, as indicated by the arrows 26. The latching hinges are of the type that permit pivoting in one direction, and then latch to prevent pivoting back. Then, upon pivoting further, the catch is released, thereby permitting the hinges to pivot back again. Such an arrangement is used for pivoting the roof outwardly and upwardly from its stowed position parallel to the wall 12 of the camper to an intermediate position, as seen in solid in FIGS. 2 and 3. The hinges latch to hold the roof in this elevated intermediate position. After the side walls of the extension are erected, as hereinafter described, the roof 21 is then lifted slightly to unlatch the hinges, and it is lowered to the phantom position seen in FIG. 2. It will be apparent that in lieu of using latching hinges 24 simple hinges can be employed and latching braces, which perform in substantially the same manner, can be used between the roof and frame. Other conventional means of retaining the roof in the intermediate position until the extension walls are erected will be apparent to one skilled in the art.

After the roof is raised to its elevated position, the floor section 16 is pivoted outwardly and downwardly on hinges 27 between it and the frame, as indicated by the arrows 28. The floor section is stopped in a horizontal position by a conventional pair of scissor links 29 at each end of the extension (see also FIG. 4). Other conventional means of supporting the outer edge of the floor section from the frame will be apparent to one skilled in the art. If desired, a tension reel can be mounted on the frame to connect to the floor section, or springs or counterweights may be used to aid in folding it up and down. It is found, however, that with the structure of floor section hereinafter described, considerable rigidity can be obtained without great weight and means are not required for assisting in the folding and unfolding.

Figure 5:
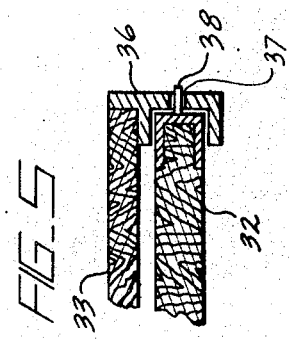
FIG. 5 is a fragmentary cross-section of the floor section of an extension.

After the floor section 16 is in its horizontal or use position, the side wall 17 is erected. The side wall is stowed beneath the upper surface of the floor section and is connected by a hinge 31 to a block 32 mounted within the floor section beneath the upper surface thereof. FIG. 4 is a skeletal view of the camper extension, with the side and end walls deleted. In addition, the floor panel 33 that forms the upper surface of the floor section is removed for clarity of illustration. In this skeletal view, it will be seen that a slot 34 extends along the full length of the outer edge of the floor section 16. The side wall 17 fits through this slot 34. The ends of the floor section 16 are each formed of like members having an inverted F-shape, as seen in the fragmentary cross section of FIG. 5. The floor panel 33 rests on these F-shaped end pieces 36. The block 32 is between the cross pieces of the F-shaped end members 36 so that these end members serve as tracks or guides for the block. One or two pins 38 extend from each end of the block 32 and through each of the slots 37.

In FIG. 2, the side wall 17 and block 32 are shown with the wall in an intermediate position, extending horizontally outwardly from the floor section. As indicated by the arrow 39, the sidewall and block reach this intermediate position by sliding outwardly by way of the slot 34 (FIG. 4) from a semi-stowed position beneath the upper surface of the floor section. When the block and side wall are inserted within the floor section, they are free to fold up and down therewith, so that when completely stowed, the side wall is parallel to the side wall 12 of the camper. After the side wall 17 has been slid outwardly from within the floor section to the position shown in solid in FIG. 2, it is pivoted upwardly and inwardly on the hinge 31 to the phantom position seen in FIG. 2, as suggested by the arrow 41. The pins 38 in the slot 37 limit the extent of travel of the block 32, and thereby position the wall 17. In lieu of slots and pins, the extent of travel of the block can be limited by a stop in the guide in which it travels.

The end walls 19 are also stowed within the floor section 16 beneath the upper surface thereof. The semi-stowed position of the end wall is seen in the end view of FIG. 2. Each of the end walls is mounted by a hinge 42 to a sliding block 43. Longitudinally extending tracks 44 at the lowermost portion of the floor section support the blocks 43 and the end walls 19 when they are in the stowed position. The tracks 44 have slots 46 within which pins 47 mounted on the blocks 43 travel. This mode of sliding is illustrated semi-schematically in FIG. 6, which illustrates the block slidably mounted for travel along the slots 46.

When the end walls are completely stowed, they are within the floor section 16 beneath the upper surface thereof, and can fold from a completely stowed position parallel to the side wall of the camper to a horizontal semi-stowed position, such as illustrated in FIG. 2. From the semi-stowed position, the end walls 19 can be slid outwardly to an intermediate horizontal position as seen in FIG. 3. From this intermediate position they are folded upwardly on the hinges 42, as suggested by the arrows 48 in FIG 3.

Each of the end walls 19 is provided with an L-shaped lip 49 along the edge that engages the side wall when the extension is erected. A U-shaped lip with the side wall entering the mouth of the U is also useful. A strip of foam plastic or other sealant 51 is preferably provided within the L-shaped lip to seal against the edge of the side wall when the end wall is erected. Similarly, a sealing strip 52 is provided along the back edge of the end wall 19 to seal against the frame 14 when the end wall is erected. The sealing strips prevent intrusion of cold air, rain or the like into the extension. The lip 49 also serves to hold the side wall 17 in its vertical position. Since the inner face of the end wall approaches the edges of the side wall and frame, a more complicated seal may be used if desired, but this simple one suffices.

The steps of erecting the extension are thus to first lift the roof section 21 to its intermediate position as seen in FIG. 2. Next, the floor section 16 is pivoted outwardly and downwardly to the position seen in FIG. 2. The side wall 17 is then slid outwardly to the position seen in solid in FIG. 2 and folded upwardly to the position seen in phantom in FIG. 2. The end walls are then slid outwardly to the solid position seen in FIG. 3, and then folded upwardly to close against the frame and side wall. The roof section 21 is then lowered to the phantom position seen in FIG. 2 to complete the closure. Preferably, shallow U-shaped locking guides (not shown) are provided within the roof section 21 for engaging the top edges of the end and side walls to further secure them in position. These guides serve as a weather seal as well, and are protected by the overhanging eaves of the roof.

Weather sealing of the roof hinges 24 is preferably provided by a short rain shield 54 extending outwardly and upwardly from the frame 14 so as to prevent direct impingement of rain on the hinge line. The upper portion of the frame thus forms a shallow gutter, and rain falling on the roof 21 runs off because of the pitch thereof. In addition, it is desirable to provide a flexible rubber shield (not shown) over the hinge 24 for further weather sealing.

A foam plastic seal strip 56 is provided around the upper portion of the floor section so that the end and side walls engage it and effect a seal. It will be noted that the sealing strip 56 is substantially above the hinge lines for the side and end walls, and therefore no sealing problems are encountered. This is an advantage that arises from stowing the end and side walls within the floor section beneath the upper surface thereof.

Another very distinct advantage of the mode of storing the walls within the floor section is that the floor is thus provided with a peripheral structure of relatively deep section so that it has a high degree of stiffness. This stiffness inhibits deformation of the floor section when someone is occupying the extension, and thereby minimizes the likelihood of warping of the seals and consequent leakage. Any sag of the floor panel 33 brings it into contact with the block 32 which carries load and also transmits it to the portion of the floor section beneath the long slot 34 for the side wall. Stiffness is thus obtained without needlessly increasing thickness or weight of the floor section.

Another advantage of storing the walls underneath the floor section is that when the extension is in its folded traveling position, as seen in the far side of FIG. 1, the upper face 33 is unobstructed and faces the inside of the camper. A mattress or the like is therefore readily attached to this floor section with straps or the like so that no additional storage for the bulky mattress is needed.

Many other features and advantages of a folding all-rigid extension for a camper will be apparent to one skilled in the art. Thus, for example, instead of providing a bed on the floor section, a kitchen unit having a stove and sink, for example, can be mounted thereon in lieu of a bed. Many other modifications and variations will be apparent to one skilled in the art, and it is therefore to be understood that within the scope of the appended claims the invention may be practiced otherwise than as specifically described.

What is claimed is:

1. A foldable extension for a camper body or the like having a vertical wall comprising:
    a floor section having an upper surface;
    means for pivotally mounting the floor section on the camper wall for pivoting between a vertical stowed position adjacent the camper wall and a horizontal use position extending outwardly from the camper wall;
    a side wall;
    means for mounting the side wall for movement between a semi-stowed position beneath the upper surface of the floor section, an intermediate position extending horizontally outwardly from the floor section, and a use position extending vertically above the outer edge of the floor section;
    a pair of end walls;
    means for mounting each of the end walls for movement between a semi-stowed position beneath the upper surface of the floor section, an intermediate position extending horizontally from the floor section, and a use position extending vertically from the floor section and in engagement with the camper wall and the side wall;
    a roof section;
    means for pivotally mounting the roof section on the camper wall for pivoting between a stowed position adjacent the camper wall and overlying the floor section, an elevated intermediate position extending outwardly from the camper wall, and a use position lower than the intermediate position and in engagement with the side wall and the end walls.

2. A foldable extension for a camper body as defined in claim 1 wherein the end walls further comprise an edge member for fixedly engaging the side wall and sealing thereagainst.

3. A foldable extension for a camper body as defined in claim 1 wherein the means for mounting the floor section and roof section comprises:
    a rigid frame for securing to a camper body;
    hinge means between the roof section and the frame for pivoting the roof section outwardly and upwardly therefrom;
    hinge means between the floor section and the frame for pivoting the floor section downwardly and outwardly therefrom; and
    means for limiting the extent of pivoting of the floor section from the frame.

4. A foldable extension for a camper body as defined in claim 1 wherein the means for mounting the walls each comprise:
    a pair of tracks mounted on opposite edges of the floor section;
    a block mounted for sliding movement along the tracks; and
    hinge means between the block and the respective wall.

5. A foldable extension for a camper body as defined in claim 4 wherein each track further comprises:
    a slot extending along a portion of the length of the track; and
    a pin mounted on the block and in engagement with the slot for limiting the extent of sliding thereof.

6. A foldable extension for a camper body as defined in claim 4 wherein the tracks for the end walls are below the tracks for the side wall.

7. A camper body for a pickup truck or the like comprising:
- a camper body selectively fittable within the bed of the pickup truck;
- a foldable extension on each side of the camper body for providing a supplemental berth, each of such extensions comprising:
- a floor section having an upper surface;
- means for pivotally mounting the floor section on the camper body for pivoting between a vertical stowed position adjacent a side of the camper body and a horizontal use position extending outwardly from the camper body;
- a side wall;
- means for mounting the side wall for movement between a semi-stowed position beneath the upper surface of the floor section, an intermediate position extending horizontally outwardly from the floor section, and a use position extending vertically above the outer edge of the floor section;
- a pair of end walls;
- means for mounting each of the end walls for movement between a semi-stowed position beneath the upper surface of the floor section, an intermediate position extending horizontally from the floor section, and a use position extending vertically from the floor section and in engagement with the camper wall and the side wall;
- a roof section;
- means for pivotally mounting the roof section on the camper body for pivoting between a stowed position adjacent a side of the camper body and overlying the floor section, an elevated intermediate position extending outwardly from the camper body, and a use position lower than the intermediate position and in engagement with the side wall and the end walls.

8. A camper body as defined in claim 7 wherein the end walls further comprise an edge member for fixedly engaging the side wall and sealing thereagainst.

9. A camper body as defined in claim 7 wherein the means for mounting the floor section and roof section comprises:
- a rigid frame fixed to a side wall of the camper body;
- hinge means between the roof section and the frame for pivoting the roof section outwardly and upwardly therefrom;
- hinge means between the floor section and the frame for pivoting the floor section downwardly and outwardly therefrom; and
- means for limiting the extent of pivoting of the floor section from the frame.

10. A camper body as defined in claim 7 wherein the means for mounting the walls each comprise:
- a pair of tracks mounted on opposite edges of the floor section;
- a block mounted for sliding movement along the tracks; and
- hinge means between the block and the respective wall.

11. A camper body as defined in claim 10 wherein each track further comprises:
- a slot extending along a portion of the length of the track; and
- a pin mounted on the block and in engagement with the slot for limiting the extent of sliding thereof.

12. A camper body as defined in claim 10 wherein the tracks for the end walls are below the tracks for the side wall.

* * * * *